United States Patent
Narukawa et al.

(10) Patent No.: US 8,405,602 B2
(45) Date of Patent: Mar. 26, 2013

(54) INFORMATION PROCESSING APPARATUS AND METHOD OF CONTROLLING THE SAME

(75) Inventors: Yoshitaka Narukawa, Saitama (JP); Shinji Nakajima, Kanagawa (JP); Masataka Suzuki, Tokyo (JP); Mikio Sakemoto, Saitama (JP); Takanori Nishimura, Kanagawa (JP); Tomohiro Tsuyuhara, Kanagawa (JP); Naoko Tobata, Tokyo (JP)

(73) Assignee: Sony Corporation, Tokyo (JP)

( * ) Notice: Subject to any disclaimer, the term of this patent is extended or adjusted under 35 U.S.C. 154(b) by 900 days.

(21) Appl. No.: 11/104,567

(22) Filed: Apr. 13, 2005

(65) Prior Publication Data

US 2005/0251697 A1    Nov. 10, 2005

(30) Foreign Application Priority Data

May 7, 2004 (JP) ................... 2004-138871

(51) Int. Cl.
*G09G 5/00* (2006.01)
(52) U.S. Cl. .............. 345/156; 345/169; 345/172
(58) Field of Classification Search .............. 345/168, 345/169, 172, 156
See application file for complete search history.

(56) References Cited

U.S. PATENT DOCUMENTS

| | | | | |
|---|---|---|---|---|
| 5,631,643 A * | 5/1997 | Hisamori et al. | ............... | 341/23 |
| 6,710,771 B1 * | 3/2004 | Yamaguchi et al. | .......... | 345/184 |
| 7,002,554 B2 * | 2/2006 | Numano et al. | ............. | 345/172 |
| 2002/0163504 A1 * | 11/2002 | Pallakoff | ...................... | 345/169 |
| 2004/0108993 A1 * | 6/2004 | Suzuki et al. | ................. | 345/156 |
| 2004/0257341 A1 * | 12/2004 | Bear et al. | ..................... | 345/157 |
| 2005/0068292 A1 * | 3/2005 | Duarte et al. | ................. | 345/156 |

FOREIGN PATENT DOCUMENTS

| | | |
|---|---|---|
| JP | 09-023470 | 1/1997 |
| JP | 09-190267 | 7/1997 |
| JP | 10-275041 | 10/1998 |
| JP | 2001-005595 | 1/2001 |
| JP | 2002-132419 | 5/2002 |
| JP | 2003-084890 | 3/2003 |
| JP | 2003-223256 | 8/2003 |

OTHER PUBLICATIONS

Andrew S. Tanenbaum, "Structured Computer Organization", 1984, Prentice-Hall Inc. pp. 10-11.*
TeamWARE Conference Microsoft ▲R▼ Windows ▲R▼, TeamWARE Conference User's Guide FMV series, First edition, Japan, Fujitsu Ltd., Jan. 31, 1996, cover page and pp. 121-122.
Microsoft ▲R▼ Windows ▲R▼ <SP>TM</SP>DTC LAN/J User's Guide (Desktop conference), First edition, Japan, Fujitsu Ltd., Oct. 31, 1993, cover page and pp. 54-55.

* cited by examiner

*Primary Examiner* — Amr Awad
*Assistant Examiner* — Randal Willis
(74) *Attorney, Agent, or Firm* — Oblon, Spivak, McClelland, Maier & Neustadt, L.L.P.

(57) ABSTRACT

Notification is sent to an upper layer via a control device 2 (a device for managing operation buttons) provided between operation buttons "A-1", "A-2" and the like and devices for operation input "Device A", "Device B" and the like such as a pointing device for executing application processing. Function assignment and the like are put under management by the control device 2, so that any modification or change is not required in the OS, drivers, and applications in association with change in key assignment, which is advantageous and effective for reduction of cost and time for product development.

12 Claims, 10 Drawing Sheets

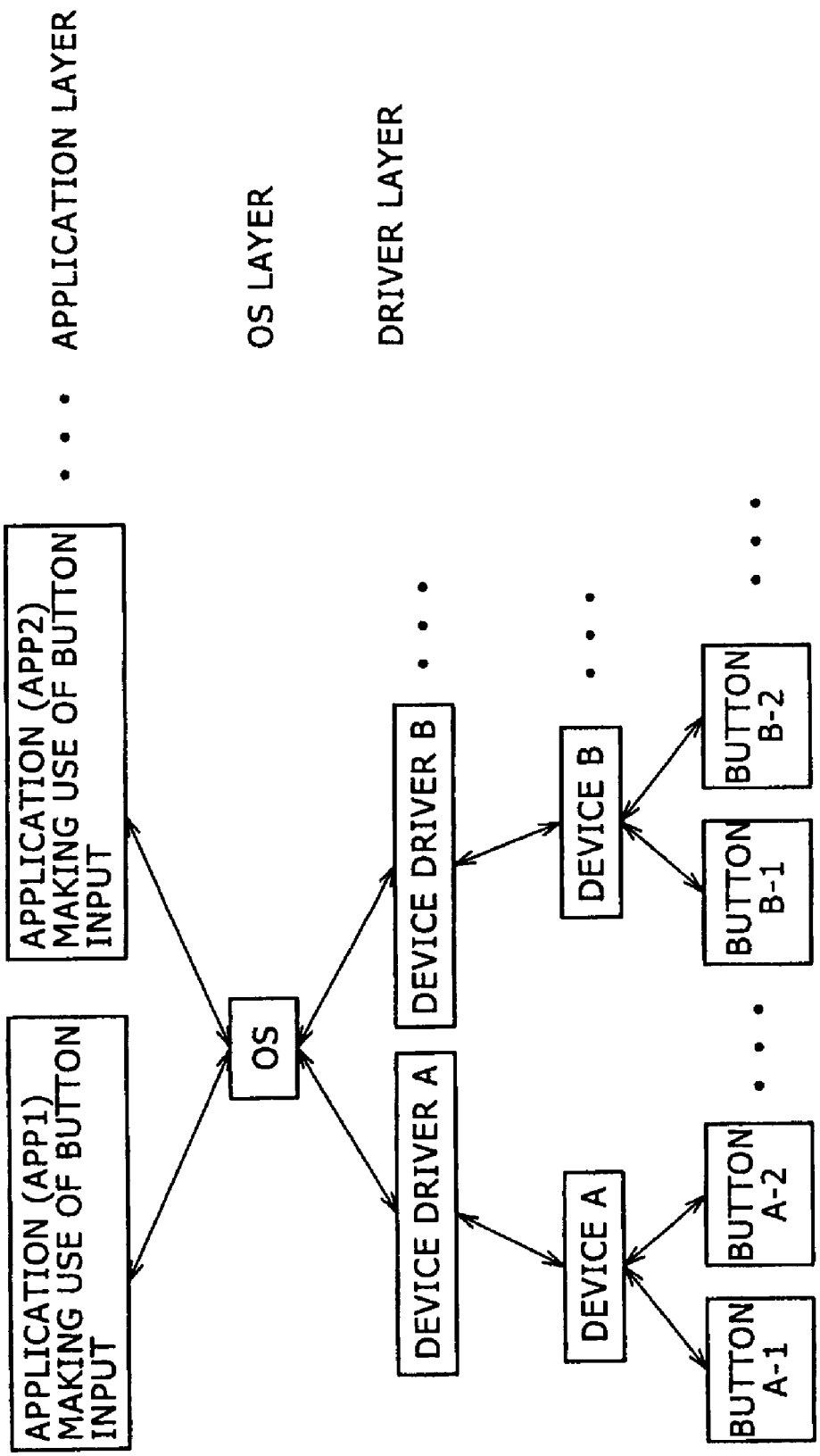

INFORMATION PROCESSING APPARATUS AND METHOD OF CONTROLLING THE SAME

BACKGROUND OF THE INVENTION

The present invention relates to a technology for enabling functional allocation to each component (such as an operation button or a key) of an operating section in an information processing apparatus so that, for instance, an operation assigned to the component can easily be enabled or disenabled.

There has been known the configuration of a liquid crystal display unit provided in a portable type of terminal device in which, for instance, a display mode for a portrait screen and that for a landscape screen can freely be selected to provide the improved operability or convenience in use of the display unit (Refer to, for instance, Japanese Patent Laid-Open No. 2003-232549). With this configuration, the operability can be improved by changing functional assignment to each operation key according to a selected display mode.

Various types of keys and switches (such as right, left, and middle buttons on a pointing device for operating a pointer on a display screen or other special keys) provided in an information processing apparatus are directly connected to devices for controlling the keys and switches respectively.

FIG. 10 illustrates a general layered structure in hardware configuration as well as in software configuration for operation and input processes.

Operation buttons "A-1", "A-2", or "B-1", "B-2" and the like are positioned as a plurality of operation buttons (hardware keys not including button objects for software processing) in the bottom layer of the hardware configuration, and devices "Device A", "Device B" and the like using the buttons respectively are positioned in the layer just above. It is assumed herein that the operation buttons "A-1", "A-2" are used in the device "Device A", and the buttons "B-1", "B-2" and the like are used in the device "Device B".

In the software configuration, there are a driver layer, an OS "Operating System" layer, and an application layer in succession from the bottom to the top, and device drivers "Device drive A", "Device driver B" and the like are provided in the driver layer. The "Device driver A" is a device driver for the device "Device A" above, and the "Device driver B" is a device driver for the device "Device B" above.

In the application layer above the OS layer, "applications "App1", "App2" and the like are positioned, and a program process or an operation is performed in response to operational information provided by a user using any of the operation keys described above. The operational information inputted via the operation button is delivered from a device corresponding to the operation button to other driver, and further is converted in the OS layer and reported as data (message) having a format appreciable for each application to the corresponding application.

When a function assigned to each operation button is always kept unchanged, it is required only to use code or a message corresponding to an operation of each operation button, but when it is necessary to change assignment of a function to each operation button, namely, for instance, when key assigns to the operation button "A-1" and to the operation button "B-1" are to be changed, the method as described below may be employed.

(1) Method in which the operation button "A-1" is read as "B-1" in the applications (App1, App2, and the like) using the operation buttons.

(2) Method in which a process assigned to an operation button is made virtual by interpreting meaning of the input with the operation buttons "A-1" and "B-1" in the OS layer and the interpreted contents is notified to the upper layer (application layer).

(3) Method in which input/output of other device is hooked in the driver layer, and an output from the operation button "A-1" is replaced with an output from the operation button "B-1", and also an output from the operation button "B-1" is replaced with an output from the operation button "A-1".

With the methods based on the conventional technology as described above, the processing required for changing functional assignment to operation buttons, operation keys, and switches becomes disadvantageously complicated. Namely, for changing the functional assignment, at least one, or a plurality of modules are required to be changed in the OS layer, driver layer, and application layer. When a change in functional assignment to an operation button or the like involves a plurality of devices, it is required to change a plurality of modules in each of the OS layer, driver layer, and application layer, which is extremely complicated.

For instance, when the method (1) above is employed, a process routine for interpreting an instruction from each operation button with different meaning is required each time an application (App1, App2, and the like) is developed, which leads to increase in cost for application development.

When the method (2) is employed, change or modification of the operating system is required, so that a large scale change may be required or sometimes a problem relating to convertibility may occur. Namely, this method is acceptable for a manufacturer developing an OS itself, but when a user uses an OS developed by a third party vendor and commercially available from the market, the user is required to request addition of specifications for changing the OS to the manufacturer of the OS (which also result in generation of additional development cost). Further a change in specifications of an OS sometimes involves a change of a device driver, and therefore when a change in specifications involving a plurality of layers is required, works such as debugging become extremely difficult.

When the embodiment (3) is employed, a device driver for a device (for instance, "Device A") hooks an output from other device (for instance, "Device B"), a developer of the driver for "Device A" is required also to know specifications of the "Device B", and similarly a developer of the driver for the "Device B" is required also to know specifications of the "Device A" (which requires increase in load for development). Namely, when a plurality of driver vendors develop different device drivers respectively, the vendors are required to disclose specifications of the products developed by each vendor. Further when a button to which the functional assignment is to be changed is used by multiple devices, development of drivers becomes further complicated (which leads to increase in time and cost for development with the possibility of generation of bugs becoming higher, and in that case also the debugging work and the like become very difficult).

As described above, in the devices based on the conventional technology, there is not provided any scheme for enabling each change in functional assignment to each operation button or key or for enabling or disabling an operation input, or the control or processes required for achieving the purpose as described above is disadvantageously complicated.

SUMMARY OF THE INVENTION

An object of the present invention is to realize change in functional assignment to each operation button and the like and to easily make setting for disabling or enabling an operation without causing escalation in complicatedness of processing or control.

To achieve the objectives as described above, the information processing apparatus according to the present invention has a control device for managing operational information in the integrated state when an application process is to be executed in response to information notified from a plurality of devices for operation input and processing operational information, and the operational information is notified from the control device to each device for operation input.

In the method of controlling an information processing apparatus according to the present invention, when operational information is notified from an operation element to a control device for managing operational information in the integrated state, the operational information is notified from the control device to each device for operation input.

Therefore, in the present invention, operational information is not directly processed by each device for operation input, and the operational information is processed via a control device functioning between operation elements including operation buttons, operation keys or switches and devices for operation input (and therefore, for instance, functional assignment to each operation element is placed under control by the control device).

With the present invention, when a function assigned to an operation button is changed or temporal assignment change is to be performed, change of modification of an OS, a driver, an application and the like is not required, so that the present invention is advantageous for reduction of cost and time required for development of a device. Further a freedom degree in designing an operating process system can be raised.

When functional assignment of each operation element is changed by the control device, key assignment can easily be changed (without the necessity of modifying any device, driver, OS and the like), and for instance, in the configuration in which a function of an operation element is replaced with that of other operation element in response to a display mode of a display screen, this system is effective for improving the operability (such as function replacement between operation button groups provided around a display screen in association with switching between a display mode for a landscape screen and that for a portrait display screen).

With the configuration in which all of or a portion of operation elements are enabled or disabled when the control device receives a signal from an instruction unit, a malfunction preventing mechanism can easily be realized without the needs of modifying any device, driver, OS and the like. For instance, in an instruction unit using a malfunction preventing switch therein, when the malfunction preventing switch is also used for switching to the power-saving mode, if an operation of an operation element for preventing a malfunction is disabled, the power-saving mode is effected, so that the power-saving effect is achieved. Further by integrating two functions in one switch, a reduction of the number of switches is achieved. When an operation signal for the malfunction preventing switch is sent to the control device for instructing a change of operation mode to the power-saving mode, the configuration is preferable in which the processing performance of a processor, performance of an image display unit, or brightness of a display screen changes in response to the power supply situation. Namely, by achieving the power-saving effect according to the power supply situation (AC driving or DC driving and the like), the power-saving effect can be achieved without substantially reducing the number of available functions.

BRIEF DESCRIPTION OF THE DRAWINGS

FIG. 10 is an explanatory view showing an example of conventional configuration.

DETAILED DESCRIPTION OF THE PREFERRED EMBODIMENT

In the present invention, components (operation elements) for an operating unit packaged in information equipment, for example, operation buttons, operation keys, and switches such as operation switches and detection switches (described as "operation buttons and the like" hereinafter) are not directly connected to devices using the components respectively, but are connected via an independent control device to the originally-assigned devices respectively, so that it is possible to freely change functional assignment to the operation buttons and the like or to perform switching between or selection of disabling or enabling the operation buttons and the like. The present invention can widely be applied to computer equipment, a PDA (Personal Digital Assistant), a network terminal device, a mobile communication terminal device, various types of image-processing devices, or audio equipment.

Figure 1:
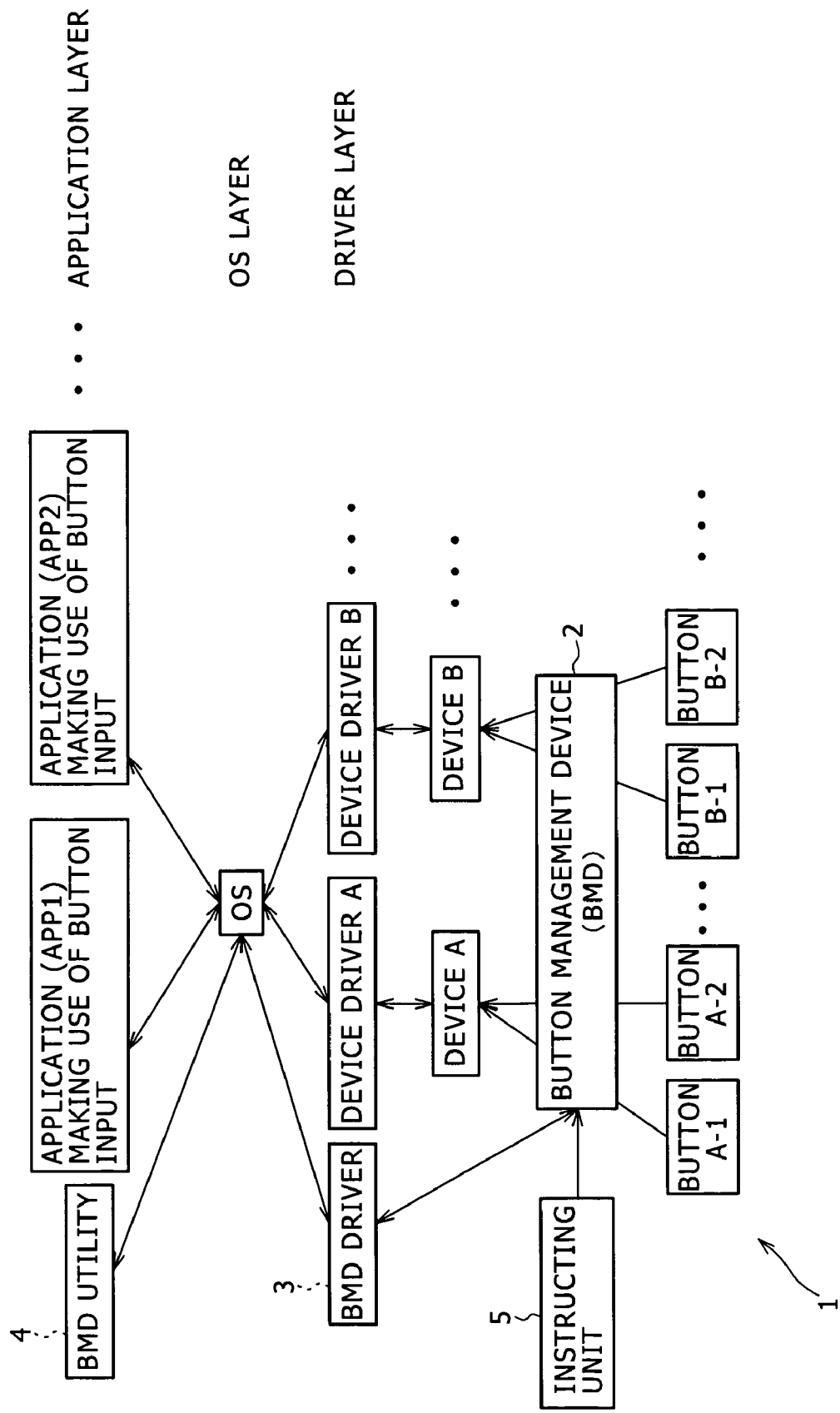
FIG. 1 is a view showing a key section of an example of the basic configuration according to the present invention.

FIG. 1 is a view showing an example of a key section of the basic configuration according to the present invention, and in this figure, the hardware layer is shown in the lower section with the software layer shown just above the hardware layer, and the software layer comprises a driver layer, an OS layer, and an application layer.

The operation buttons "A-1", "A-2" or the like, or "B-1", "B-2" or the like are positioned, and all of these buttons are hardware keys. That is, the buttons excludes keys (soft keys or virtual keys) constituting a display screen (so-called virtual keyboard) for a key operation program realized by software.

A control device 2 ("Button Management Device" in this example, and described as "BMD" hereinafter) for managing operational information inputted in response to an operation of each operation button in the integrated state is positioned in a layer just above, and the devices "Device A", "Device B" and the like are positioned in the further upper layer. These are devices for input operations with hardware keys.

When a user of an information processing apparatus 1 operates any of the operation buttons "A-1", "A-2" or the like, or "B-1", "B-2" or the like, the operational information is notified via the BMD 2 to the devices "Device A", "Device B" and the like (These devices are the same as those shown in FIG. 10).

Provided in the driver layer constituting the software configuration are the device drivers "Device Driver A", "Device Driver B" and the like, or the device driver ("BMD Driver") described hereinafter. The "Device Driver A" and "Device Driver B" are the same as those shown in FIG. 10.

Provided in the application layer above the OS layer are the applications "App1", "App2" and the like or the utility program ("BMD Utility") described hereinafter.

Operational information from each operation button is notified from a device having notification from the BMD 2 to a device in the upper layer, and is further notified via the OS layer to each application. With this configuration, application processing is executed in response to operational information from a hardware key.

The difference between this configuration and that shown in FIG. 10 is that the BMD 2 is provided between operation buttons and devices, and change of assignment to operation buttons or the setting process for enabling or disabling an operation input or the like can freely be carried out, as shown below, only by function of firmware operating within BMD 2.

At first, change of functional assignment to operation buttons is described.

When the information processing apparatus 1 runs in the normal operation mode, a signal indicating an operating state of each operation button, namely pressing or releasing passes as it is through the BMD 2 and is provided as an output. Namely, the operation signal is sent to the BMD 2, and then transmitted as it is to each device corresponding to the signal, and prespecified processing is carried out.

When functional assignment to the operation buttons and the like is changed, within the BMD 2, the connectional relation between the object operation button and a device or devices is changed, and the operation signal is inputted to each device.

For instance, when the functions assigned to the operation buttons "A-1" and "B-1" are exchanged with each other (function exchange in association with assignment change), the substitution as described below is carried out by internal processing in the BMD 2.

Output from "A-1" to output from "B-1"
Output from "B-1" to output from "A-1"

In other words, when the operation button "A-1" is pressed, the output is replaced with an output from the operation button "B-1" within the BMD 2, and when the operation button "B-1" is operated, the output is replaced with an output from the operation button "A-1" within the BMD 2.

As a result, it is not necessary to take any specific measures in relation to change of functional assignment to operation buttons in the device layer or in the upper software layer, and the device "Device A" can receive information indicating a state of the operation button "B-1" (Press/Release) as that for the operation button "A-1". Similarly, the device "Device B" can receive information indicating a state of the operation button "A-1" (Press/Release) as that for the operation button "B-1".

When simple change such as change in functional assignment to operation buttons is performed, in other words, for instance, when roles of two operation buttons are exchanged with each other, by directly transmitting a trigger signal for changing the functional assignment according to an instruction by a user or to various events, the control can be completed within firmware for the BMD 2, which contributes to simplification of the configuration. However, when more complicated change of function assignment is required, or when flexibility in a process for function assignment is required to be improved, use of a driver 3 (BMD driver) for BMD as shown in FIG. 1 or a utility program 4 (BMD Utility) for changing function assignment is preferable and assignment controls for the operation buttons are performed by using utilities. (A square shown with a broken line in FIG. 1 indicates that the needs for the software varies according to each configuration, namely that function assignment is arbitrary).

As described above, the operational information is transferred via the BMD 2 to upper devices, and further to an application via the processing system using a device driver or an operating system, but basic processing for changing functional assignment is executed by the BMD 2, so that modification of the device driver or the OS is not required.

Next, an operation for enabling or disabling an operation button is described below.

When the configuration as shown in FIG. 1 is employed, all of signals indicating operating states of operation buttons (Press/Release) are inputted into and managed by the BMD 2, so that, by ignoring (namely intersecting) the signal for any operation with the BMD 2, operations of any operation buttons can be enabled or disabled in batch.

In other words, by disabling an operation, the same electric state as that where a button for the operation is not pressed is effected, so that the malfunction preventing function can easily be implemented in the information processing apparatus 1. One of the advantages when this embodiment is employed is that, when power to the BMD 2 is ON, an operation can be enabled or disabled within the BMD without requiring the processing by the OS or by other control program. Namely even when a CPU (Central Processing Unit) of the information processing apparatus 1 does not work (for instance, in the power-saving mode), an operation of any operation button can be disabled or enabled.

Even in this case, like in the case described above, in the processing system including devices connected to the BMD 2 and device drivers thereof, or an OS, and applications, any specific operation for enabling or disabling an operation button is not required. In other words, the state where operational information to a device layer or a software layer just above the device layer is masked, namely the state where any operation button has not been pressed is effected.

The operation for enabling or disabling an operation button is carried out when the BMD 2 receives a signal from an instructing unit 5 shown in FIG. 1, all operations relating to all operation buttons excluding the instructing unit 5 are disabled, or only prespecified operations or those specified by a user are disabled, and upon a subsequent instruction from the instructing unit 5, the disabled operations are again enabled (enabling).

The instructing unit 5 transmits an instruction signal for disabling to the BMD 2 in the configuration in which the malfunction preventing switch (hold switch or the like) or when it is detected by a time counter such as a timer or the like that a manipulation or an operation of the device is not performed for a prespecified period of time or for a period longer than that which can be changed by the user's operation.

Figure 2:
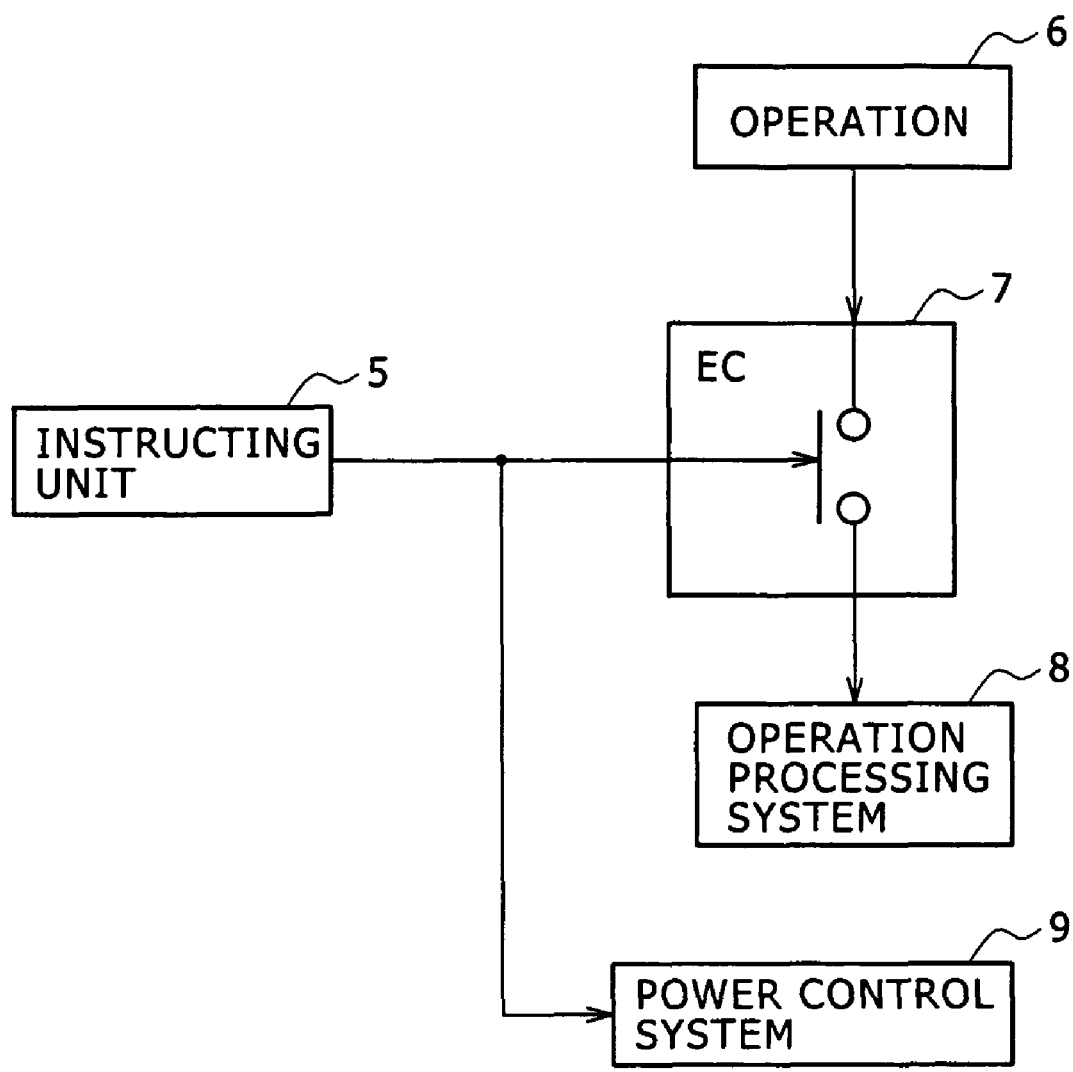
FIG. 2 is a conceptual diagram showing the basic configuration for realizing the setting for malfunction prevention and power-saving state in the present invention.

FIG. 2 is a conceptual diagram showing the basic configuration for realizing the setting for prevention of malfunctions and power saving with a signal from the instructing unit 5.

The information from an operating section 6 including operation buttons and the like is sent via a masking section 7 shown with a sign of a switch in the simplified form to the operation processing system 8, and the masking section 7 having received the signal from the instructing unit 5 decides whether the operational information is to be delivered to the operation processing system 8 or not. Namely, when an operation is disabled in response to a signal from the instructing section 5, the operational information is intersected by the masking section 7.

A power control system 9 manages and controls devices within the information processing apparatus (such as a device for calculating such as a CPU or an image display device) or a power supply section and changes the power consumption state, and when the operations of the operation buttons and the like are disabled according to an signal from the instructing unit 5, the system state is shifted to the power-saving state.

For instance, when the information processing apparatus 1 is not being used, if the user operates the malfunction preventing switch to disable an operation of a hardware key, the information processing apparatus 1 is preferably shifted to the power-saving state in response to an operation signal from the malfunction preventing switch as a trigger. Namely, in the configuration in which, when the malfunction preventing function is effective, even if the operation is disabled and use of the function is restricted, power is consumed like in the usual mode, power is wasted. Therefore, it is effective to positively reduce power consumption in the state where an operation of any operation button is disabled by the malfunction preventing function (However, consideration is necessary so that functions of the information processing apparatus will not remarkably be limited).

When the malfunction preventing switch for disabling an operation of the information processing apparatus also has the function to change the power consumption mode of the information processing apparatus to a specific set state, the operability is improved and the area occupied by the component can be reduced (In the configuration in which the malfunction preventing switch and a switch dedicated for power saving are provided discretely, the area occupied by the switches becomes larger).

Further in the configuration in which the power-saving mode can be effected by operating the malfunction preventing switch, the effect of power saving can easily be achieved (by, for instance, shifting the operation mode to that in which the power consumption is minimized) even if the user does not have the awareness of the necessity of power saving.

By assigning the malfunction preventing function and the power-saving function to a single switch, operations of the information processing apparatus can be simplified. For instance, in the case where various functions are assigned to a plurality of different switches respectively and operations or processing by the GUI (Graphical User Interface) of the OS have not been unified, the user is compelled to learn the operating procedure each time. In the case in which various functions are assigned to a plurality of operating systems, when the various functions are to be used continuously, the user must learn finger movement or mouse operations, and for instance, when a user uses the machine holding it with two hands, the holding state may become unstable.

When an information processing apparatus is used in the state where operations of the main body thereof are disabled, the battery-driven period can be prolonged or unnecessary heat emission is suppressed to improve the safety by energizing only the required minimum devices to effect the power-saving mode (The specific procedure for effecting the power-saving mode is described hereinafter).

The description above assumes a case in which, when a user operates one operation button, an operation or processing corresponding to the operation button is executed, but the present invention is not limited to the configuration as described above, and also the configuration is allowable in which, when a user operates a plurality of operation buttons simultaneously, the processes or operations previously specified to the operations are executed (Multiplexing of button operations with the BMD).

With the conventional configuration as described above shown on the left side in FIG. 3, a plurality of operation buttons (in this example, "Button i" (i=1 to 6)) are used, and an operation signal from each operation button is supplied to one device 10 (such as pointing device).

Figure 3:
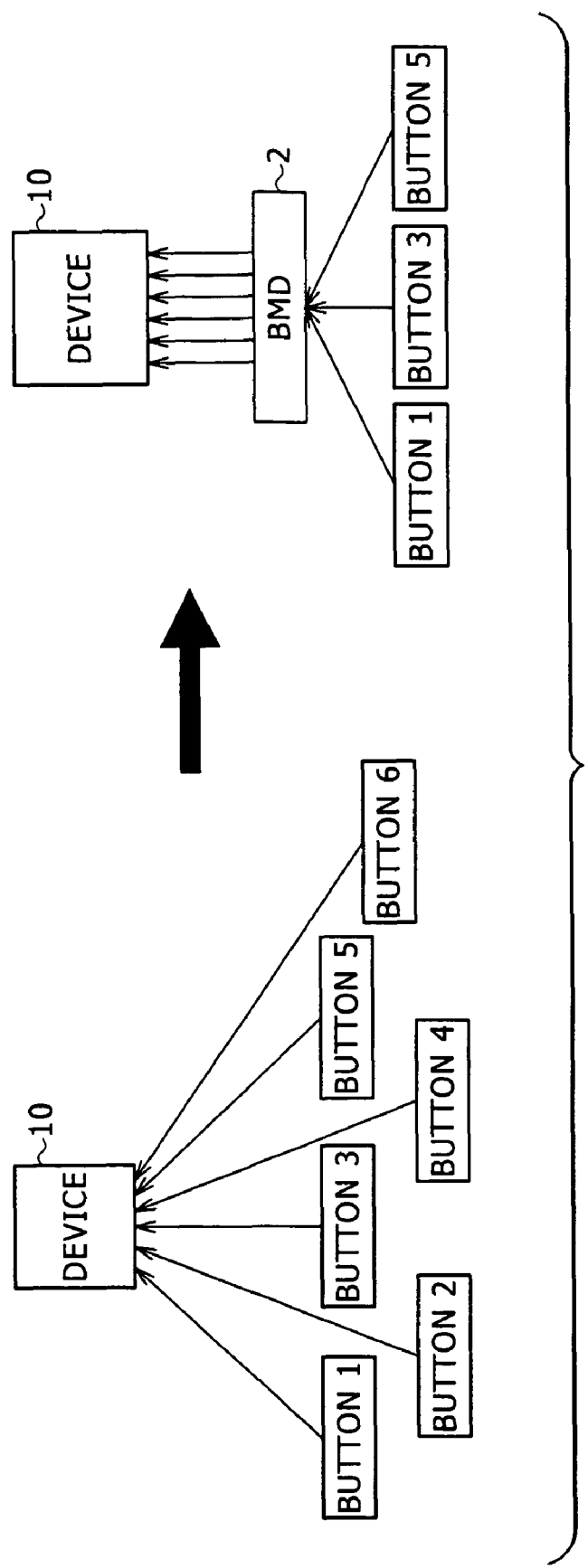
FIG. 3 is an explanatory view for illustrating function assignment effected when a plurality of operation buttons are simultaneously operated.

On the other hand, with the configuration shown on the right side in FIG. 3 illustrating an example to which the present invention is applied, a plurality of operation buttons (in this example, "Button i" (i=1, 3 and 5)) are used, and an operation signal from each operation button is supplied to the BMD 2, after which each of six different signals are supplied to the device 10.

As a function realized when a plurality of operation buttons are pressed simultaneously, a different function can be assigned by the firmware for the BMD 2 as shown below.

Operation of simultaneously stroking Button 1 and Button 3=Operation realized when Button 2 is stroked once
Operation of simultaneously stroking Button 3 and Button 5=Operation realized when Button 4 is stroked once
Operation of simultaneously stroking Button 1 and Button 5=Operation realized when Button 6 is stroked once The "=" above indicates that the operation on the left side and that on the right side provide the same function.

For instance, when Button 1 or Button 3 is stroked once, a function corresponding to each operation button is realized, but when the two buttons are pressed simultaneously, a function corresponding to Button 2 is realized, and thus the number of operation buttons can be reduced to 6 to 3. In a case of a compact information processing apparatus having excellent portability, as the size is small, the area for mounting operation buttons and the like is disadvantageously small, but with the configuration as described above, even if the number of operation buttons is reduced, the functions originally installed in the device can be packaged as they are.

By using the BMD 2, multi-functional buttons can be realized with a small number of operation buttons, which is effective for reduction of an area required for mounting operation buttons and cost. Although one function can be assigned to an operation of simultaneously stroking three or more buttons, when degradation of operability is taken into consideration, a function should preferably be assigned to a combination of as small number of button operations as possible.

In FIG. 1, in the configuration where "Device A" and "Device B" are never used simultaneously, by dynamically switching connecting relation between a group of operation buttons and devices such as using the operation buttons "A-1", "A-2" and the like as connected to "Device A" at one time and also using the operation buttons "A-1", "A-2" and the like as connected to "Device B", the group of operation buttons can be shared by a plurality of devices (thus, for instance, the operation buttons "B-1", "B-2" and the like may be omitted).

Figure 4:
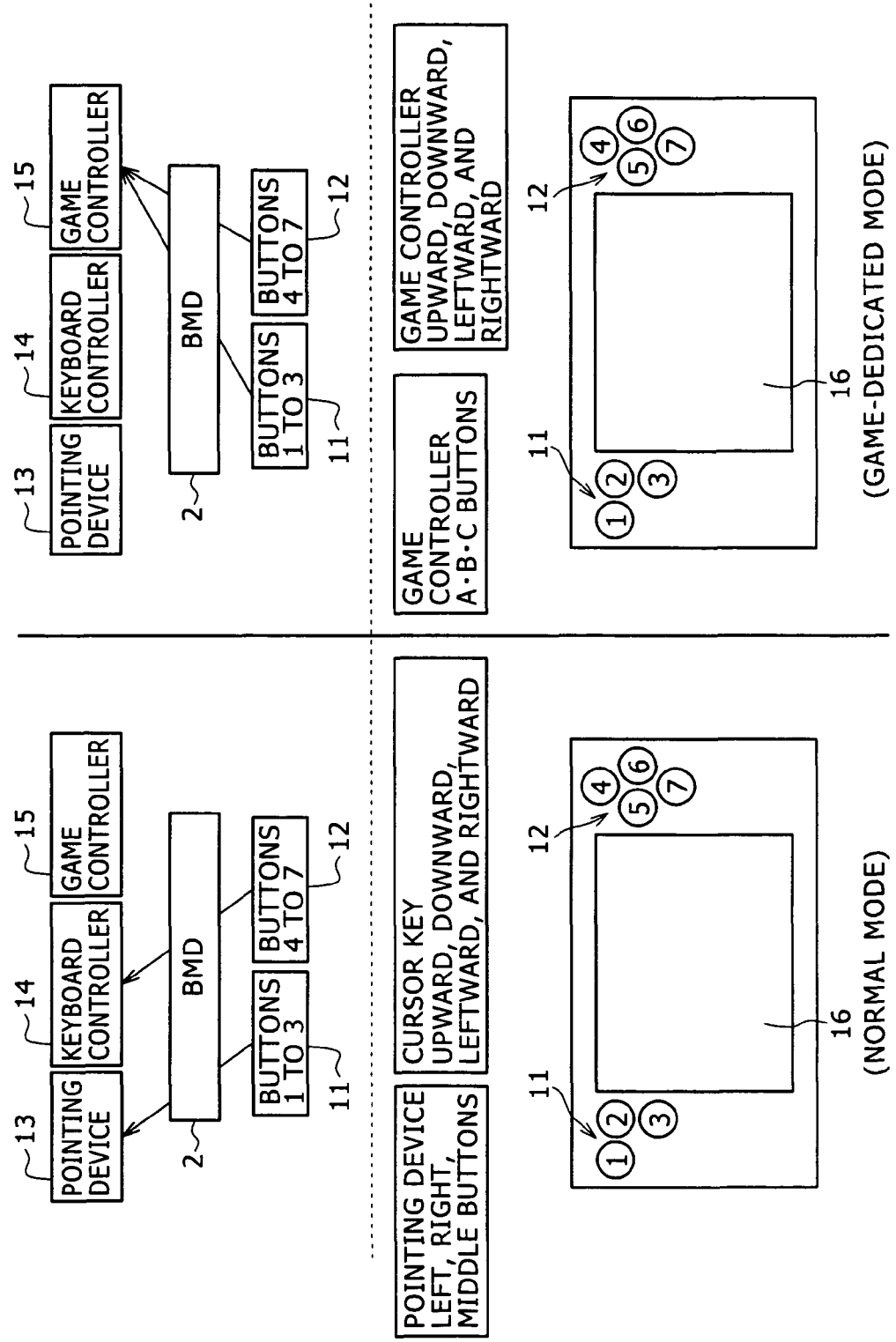
FIG. 4 is an explanatory view showing a case in which an operation button is shared by a plurality of devices.

The configuration in which operation buttons are shared by a plurality of devices is described below with reference to the configuration shown in FIG. 4.

In this example, a group 11 of operation buttons having the numbers of 1 to 3 respectively and a group 12 of operation buttons having the numbers of 4 to 7 are provided in a device, and each operation signal is notified according to the necessity via the BMD 2 to three devices 13, 14, and 15. For instance, the device 13 is a pointing device, the device 14 is a keyboard controller, and the device 15 is a game controller.

It is assumed herein that the information processing apparatus has two operation modes (for instance, a first mode called as "ordinary mode" and a second mode called as "game dedicated mode", and also that a device 15 is not used in the "ordinary mode" and only the device 15 is used in the "game-dedicated mode" (devices 13 and 14 are not used).

In the "ordinary mode", the operation button group 11 (consisting of operation buttons 1 to 3 each surrounded with a circle) shown in the left side of a display screen 16 is used by the device 13, and when an operation signal is supplied from each operation button via the BMD 2 to the device, the buttons 1 to 3 function as left, right, and middle buttons. Further the operation button group 12 (consisting of operation buttons 4 to 7 each surrounded with a circle) shown in the right side of a display screen 16 is used by the device 14, and when an operation signal is supplied from each operation button via the BMD 2 to the device, the buttons 4 to 7 function as top, bottom, left, and right cursor keys respectively.

When the operation mode is switched to the "game-dedicated mode", all of the operation button groups 11, 12 are used by the device 15.

When an operation signal is sent from each operation button constituting the operation button group 11 (consisting of operation buttons 1 to 3 each surrounded with a circle) shown in the left side of the display screen 16 via the BMD 2 to the device 15, the buttons function as those for operation of the game respectively. Further when an operation signal is sent from each operation button constituting the operation button group 12 (consisting of operation buttons 4 to 7 each surrounded with a circle) shown in the right side of the display screen 16 via the BMD 2 to the device 15, the buttons function as those for indicating upward, downward, leftward, and rightward directions respectively.

By switching the device as a destination for connection of each operation button according to the currently set mode with the BMD 2, the number of buttons can be reduced without reducing the required functions.

An embodiment of the present invention in which the present invention is applied to a portable type of computer equipment is described with reference to FIG. 5 to FIG. 9.

Figure 5:
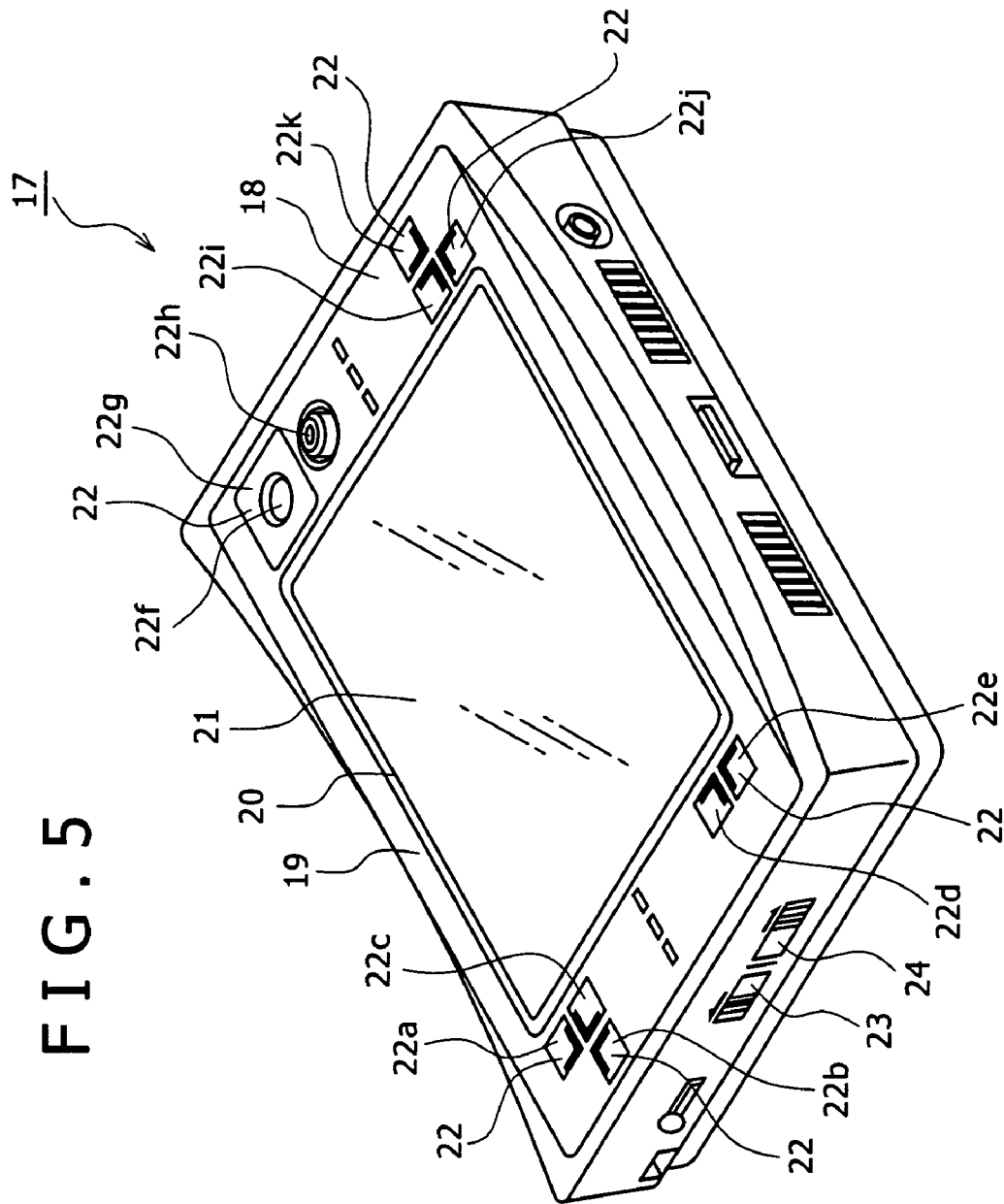
FIG. 5 is a view for illustrating an example of the present invention together with FIG. 6 to FIG. 9, and this view is a perspective view showing an outer appearance of the information processing apparatus.

As shown in FIG. 5, a housing 18 of the information processing apparatus 17 has a horizontally long and flat form, and a display device 20 (liquid crystalline display and the like) constituting an image display unit is provided on a front surface 19.

A touch panel is provided on a display surface 21 of the display device 20, and a user can perform an operation for selecting or inputting data by tapping a desired position on the display screen with a finger or a dedicated input pen (stylus or the like).

A plurality of operation buttons 22, 22, . . . as described below are provided at a prespecified position of the housing 18:

Middle button 22a, left button 22b, right button 22c (Refer to the left top section on the display screen 21)
Zoom button 22d, rotation button 22e (Refer to the left bottom section on the display screen 21)
Enter button 22f, cursor key 22g, operating section of the pointing device (operation stick) 22h (Refer to the right top section of the display screen 21)
Function selection button 22i, start button 22j, brightness change button 22k (Refer to the right bottom section of the display screen 21)
Hold switch 23, power switch 24 (Refer to the left side face section of the housing 18)

The middle button 22a, left button 22b, and right button 22c correspond to a mouse button respectively, and the zoom button 22d is used to enlarge or contract the display screen.

A rotation button 22e is used to rotate an image display by 90 degrees.

An enter key 22f corresponds to an enter key on a keyboard, while the cursor key 22g is used to move the cursor upward, downward, leftward, or rightward. The operating section 22h of the pointing device is used to move a pointer on the screen, and the function selection button 22i is used, for instance, to change a volume of voices and sounds or switch an output to an external display device. The start button 22j is used to start an application, and the brightness change button 22k is used to change the brightness of the display device 20.

The hold switch 23 is used to disable or enable an operation of any other operation button, and a power switch 24 is used to turn ON or OFF power.

It is to be noted that function assignment can freely be changed to various operation buttons and switches excluding the hold switch 23 (Namely, the functions assigned to each key described above are not a fixed one, and the description above indicates an example of function assignment in a specific operation mode). Further in the case described above, operation buttons and the like are provided on a main body of the device, but the present invention is not limited to this configuration, and also the configuration is allowable in which a wired remote controller connected to the device body is also used.

Figure 6:
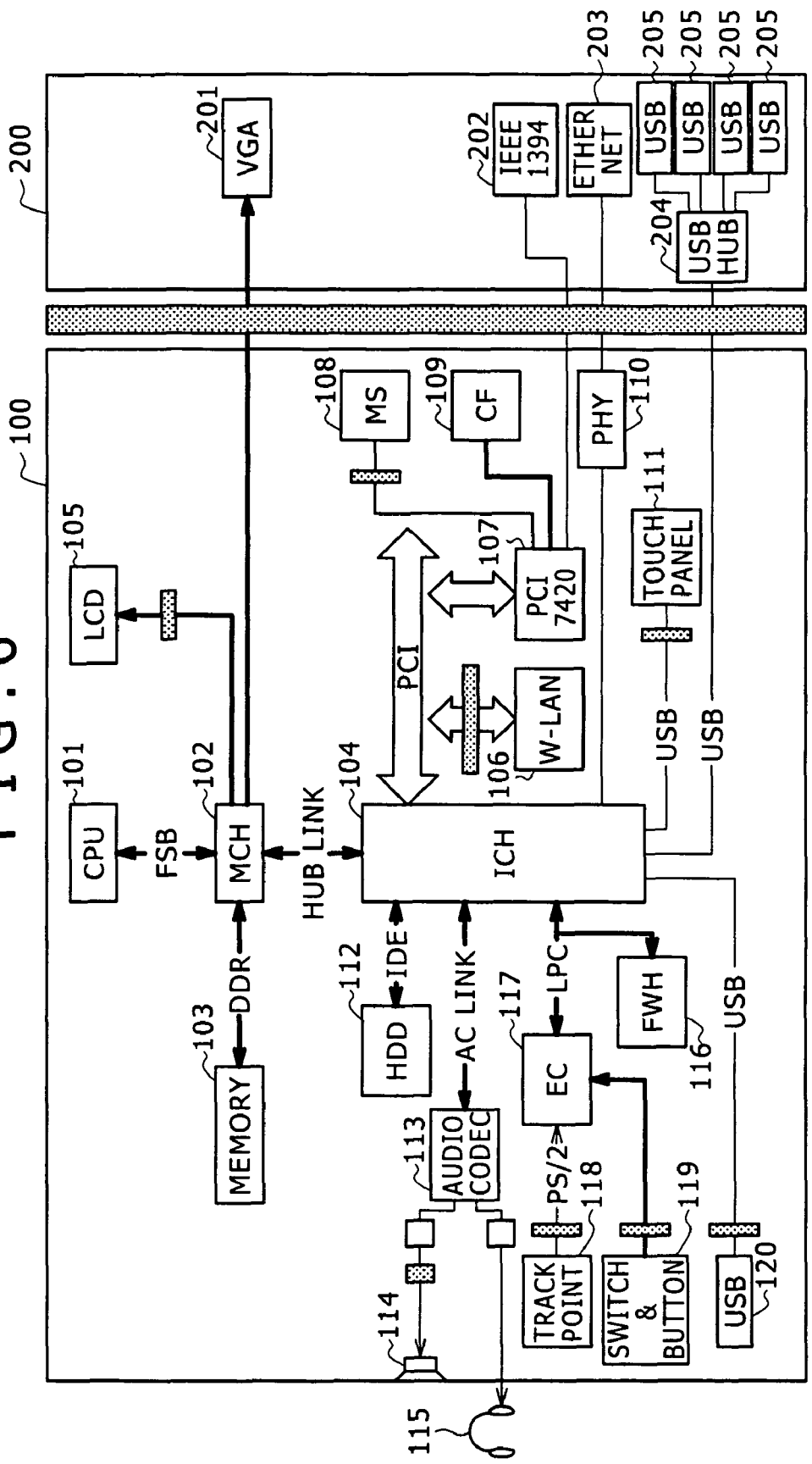
FIG. 6 is a view showing an example of hardware configuration of the information processing apparatus.

FIG. 6 is an example of hardware configuration of the information processing apparatus 17, and a device body 100 and an interface device 200 for connection to an external device are shown in the figure.

At first, configuration of the device body 100 is described.

A CPU 101 as a central section for control is connected via a bus (FSB: Front Side Bus) to a controller 102. The controller 102 controls a main memory 103 or the graphic functions, and mainly processes a large volume of data at a high speed. In the AT-compatible machine, the controller 102 is described as "north bridge", and the CPU 101, the main memory 103, a graphic display device 105 such as a liquid crystal device, and a controller 104 are connected to the controller 102 in this example.

The controller 104 mainly controls control devices for user interface and the like, and provide bus link for devices. In the AT-compatible machine, the controller 104 is called as "south bridge", and in the "IPC to ISA bridge", the controller 104 bridges the bus (PCI: Peripheral Component Interconnect bus) to a low speed bus (ISA: Industry Standard Architecture bus), and functions as the ISA controller, IDS (Integrated Drive Electronics) controller, and the like.

Connected to the bus (PCI bus) is a wireless LAN (W-LAN) as a radio communication device 106, or a device 107 for connection of or controlling an external memory or other external devices. As an external memory, there is provided a semiconductor memory device which can be loaded on or off from the device body 100 such as a control device 108 for read and write data to and from a stick-like memory medium, or a control device 109 for a compact flash (trademark) card and the like. The device 107 has a function as an interface for connection with external devices (for instance, "IEEE" for defining hardware specifications for adding a serial device to a computer).

A device 110 for connection of LAN (Local Area Network) such as Ethernet (registered trademark) is connected to the controller 104, and also an input device 111 using a touch panel or the like is connected to a USB (Universal Serial Bus) port thereof.

As an auxiliary device 112, for instance, a drive unit using a magnetic disk or an optical disk is used, but in this example, a drive unit using a large capacity storage medium such as a hard disk is used and is connected to the controller 104 (an IDE controller therein).

An audio signal processing section (Audio Codec) 113 connected to the controller 104 transmits an audio signal having been subjected to digital-analog conversion to, for instance, a speaker 114 or headphones 115 for outputting voices and sounds. In a device having a microphone, the processing is carried out for converting audio input data to digital data. The processing for outputting an audio signal can be executed independently from the processing of image signals for screen display, so that, in the configuration in which also a remote controller is used, an operation for reproducing music or the like can be performed by a user with operation buttons provided on the remote controller in the state where power to the graphic device 105 and the like is disconnected.

A storage device 116 has a control program for running a computer and the like stored therein, and is connected to the controllers 104, 117 with an LPC (Low Pin Count: serial bus) and the like.

The controller 117 is a general purpose device such as an "EC" (Embedded Controller) for controlling various types of signals, and provides controls over functions of a keyboard controller, system power, or for additional functions for the system (A microcomputer is incorporated in a portable type machine). It is to be noted that a method of controlling a computer can be changed by changing a control program in the storage device 116.

An operation device 118 constituting a stick type of pointing device (track point and the like) is connected to a port (such as the PS/2 (Personal System/2) port and the like) of the controller 117. Further a signal from an operating section 119 including switches and buttons provided in the device body 100 is sent to the controller 117.

A USB connector is provided as a connecting section 120 for directly connecting an external device to the device body 100, and the connector is connected to the controller 104.

A utility power voltage from an AC adaptor or a DC current from a battery pack using a secondary battery, a fuel cell, or the like is supplied to a power source section not shown. The EC described above stores therein, for instance, various types of management information used for detecting connection or a mounting state of the AC adaptor or the battery pack or for checking a residual capacity of the battery and the like.

Next configuration of a connection device 200 is described.

The device body 100 transacts signals with external devices not shown when the device 200 for connection with an external device is connected thereto via a connection unit such as a connector.

A connector section 201 for connecting thereto an external display device with a VGA (Video Graphics Array) connector or the like is connected to a controller 102 inside the device body 100, and because of this connection, image signals and the like are outputted to the external display device.

Further a connector section 202 for connecting thereto an external device based on the "IEEE 1394" standard or the like is connected to the device 107 inside the device body 100, and a connector section 203 for connecting the Ethernet (registered trademark) cable and the like is connected to the device 110 inside the device body 100.

A USB hub is used as a device 204 for line concentration connected to the controller 104 in the device body 100, and in this example, four USB connectors 205, 205, . . . are provided in the connection device 200, and each of the connectors is connected to the USB hub.

Figure 7:
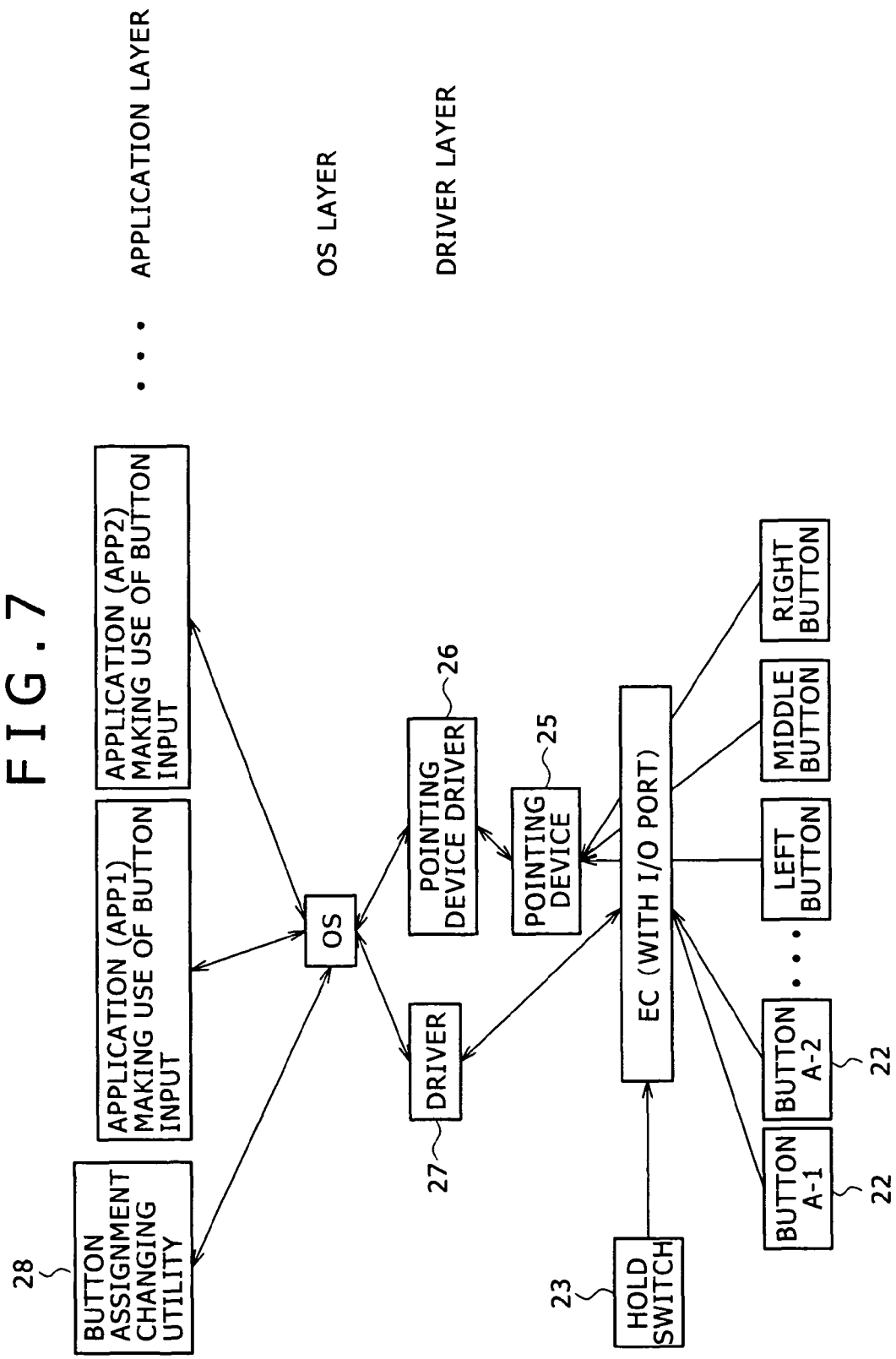
FIG. 7 is a view showing a key section of layered structures of hardware configuration and software configuration.

FIG. 7 is a view showing a key section of a layered structure in the hardware configuration as well as in the software configuration in this example.

Various types of operation buttons "A-1", "A-2", . . . (operation button 22) are provided in the bottom layer in the hardware configuration including, for instance, the left button, middle button, right button, and the like each used for operating a pointer on the display screen. The hold switch 23 operated for giving an instruction for disabling or enabling an operation button is also provided in the bottom layer.

In this example, an EC (including a programmable I/O controller) is used as the BMD, and a pointing device is positioned as an upper device 25 for the EC.

In the software configuration, a device driver 26 for the upper pointing device and a driver 27 functioning as the BMD driver 3 are positioned in the driver layer. An OS layer is positioned above the driver layer, and applications ("App1", "App2", or a utility 28 for changing function assignment to buttons functioning as the "BMD Utility 4") are positioned above the OS layer.

Figure 8:
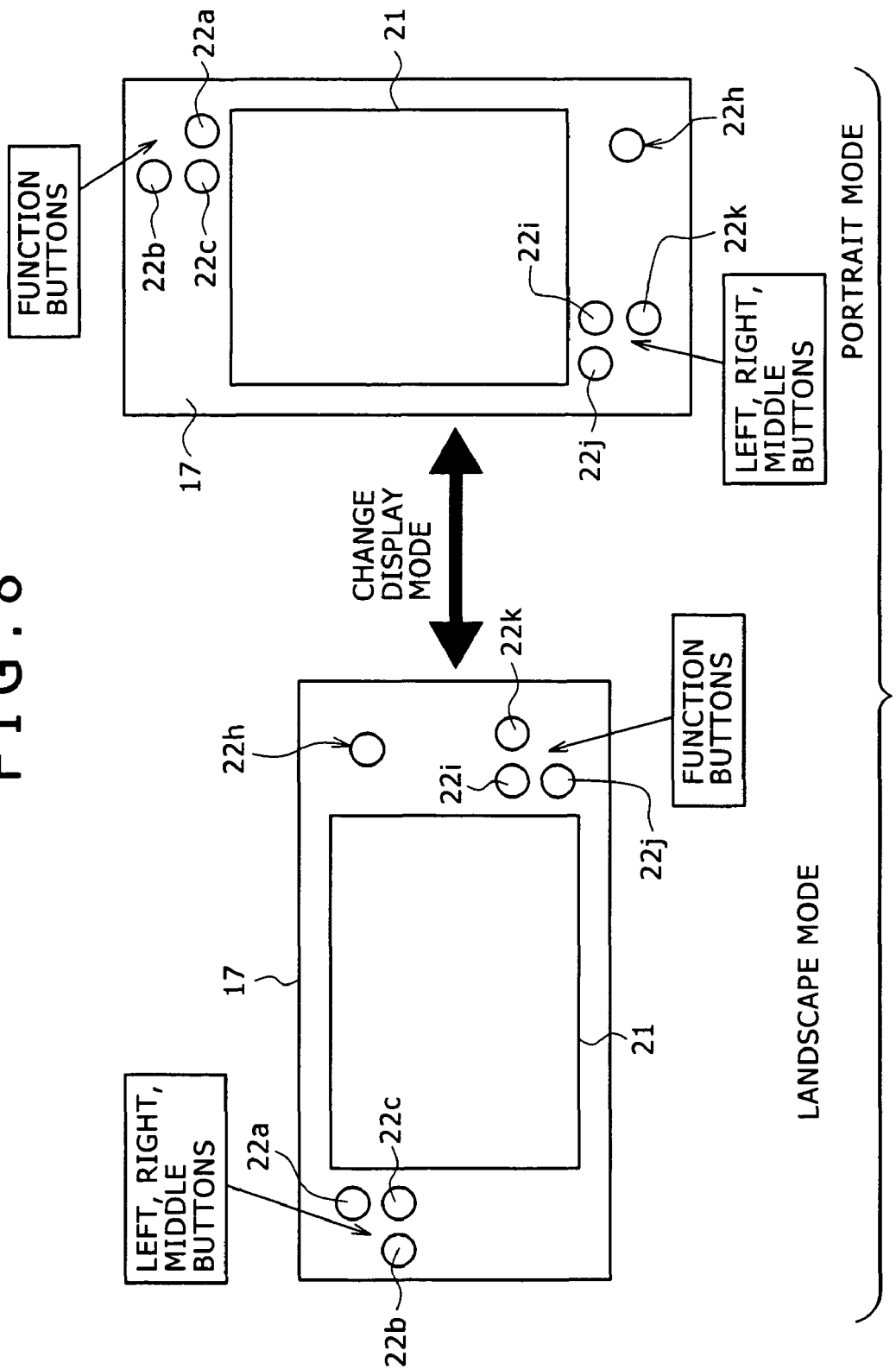
FIG. 8 is an explanatory view showing an example of function assignment to operation buttons in association with change of the image display mode.

When a user uses the information processing apparatus 17 holding it in the horizontal posture in the state where an image is rotated by 90 degrees, namely so that the longitudinal direction of the device is in the substantially horizontal direction as shown in the left side of FIG. 8, the display mode on a landscape screen is effected, and when the user uses the device holding it in the vertical posture so that the longitudinal direction of the device substantially matches the vertical direction, the display mode on a portrait screen is effected.

In the display mode on the landscape screen, the three operation buttons 22a, 22b, and 22c shown in the left side of the screen function as the middle button, left button, and right button each described above respectively, and the three operation buttons 22i, 22j, and 22k shown in the right side of the display screen function as function keys for changing the brightness and the like. In this state, the operating section (operation stick) 22h is positioned in the right top section of the display screen.

Further in the display mode on the portrait screen, the three operation buttons 22i, 22j, and 22k shown in the left bottom section of the screen function as the right button, left button, and middle button for the pointing device respectively, and the three operation buttons 22a, 22b, and 22c shown in the right top section of the display screen function as function buttons for changing the brightness and the like respectively. In this state, the operating section 22h is positioned in the right bottom section of the display screen.

In association with switching of the display mode as described above, the functional assignment is exchanged between the functional button group and a group of left, middle, and right buttons relating to the pointing device (exchange of functions).

When the utility 28 for changing function assignment to operation buttons detects a signal as a trigger for the processing for screen rotation, a signal generated when the rotation button 22e described above is pressed, or an event of a rotation of a screen display on the display device 20, the utility 28 issues an instruction for changing functional assignment to the EC via a driver 27 from the OS layer. The EC having received this instruction executes assignment change for the operation buttons under control by the firmware operating therein (Refer to FIG. 8).

Because of this feature, a user of the information processing apparatus 17 can maintain the operating position at which an operation stick for a pointing device is positioned in the right-hand side and the left, right, and middle operation buttons for the pointing device are positioned in the left-hand side in the state where the user holds the information processing apparatus with hands irrespective of the rotated state of a display image, and therefore the operability is excellent.

By operating the hold switch (malfunction preventing switch) 23, the user of the information processing apparatus 17 can switch the set state for enabling or disabling operations of various operation buttons or input interfaces installed in the main body (When a signal is sent from the switch to the EC, the EC executes the processing for enabling or disabling an operation of each operation button). When a signal instructing holding of an operation button or the like is received, the EC disables an operation of the button, and when a signal instructing releasing the held state of the operation button is received, the EC enables the operation button. With this operation, the function for preventing malfunctions can be realized in a user friendly aspect.

As described above, the function for changing functional assignment to each operation button or the function for enabling or disabling an operation of each operation button can be realized without making control complicated.

Next an operation for setting the information processing apparatus 17 in the power-saving mode in response to an operation of the hold switch 23 (processing for power saving) is described below.

With the power-saving function in an information processing apparatus based on the conventional technology, in most cases, by preserving stored information stored in a volatile storage device using a semiconductor memory or the like with some method or other, power supply to other internal devices is stopped to set the device in the stand-by state, and power consumption in the stand-by state is suppressed (In this case, all of the functions of the information processing apparatus are basically disabled).

In contrast, in the information processing apparatus 17, in addition to the power-saving function based on the conventional technology, by specifying an application and enabling only the required minimum functions, the power-saving mode providing the sufficient power-saving effects is realized without unnecessarily restricting the functions as an information processing apparatus.

When an EC (for instance, based on the ACPI specifications [Advanced Configuration and Power Interface Specification]) is used as the BMD as described above, an operation signal for the hold switch 23 is sent to and detected by the EC, and is notified to an upper driver. Then, an instruction for shifting to the power-saving mode is notified from the driver directly or via the OS layer or other applications to an application for power management (or for setting the power-saving mode).

In the processing using a program for changing the set state in management of a power source or a battery, for instance, switching of a profile (setting for management of a device) is performed automatically or manually, or a display for a residual capacity of a battery or for estimated time for discharging or an alarm for reduction of the battery capacity and the like are provided. The following profiles described below relate to the set state for power-saving mode, and as described above, the profile is switched according to the operating state of the hold switch 23 to decide whether the information processing apparatus is driven with an AC adaptor or a battery.

Figure 9:
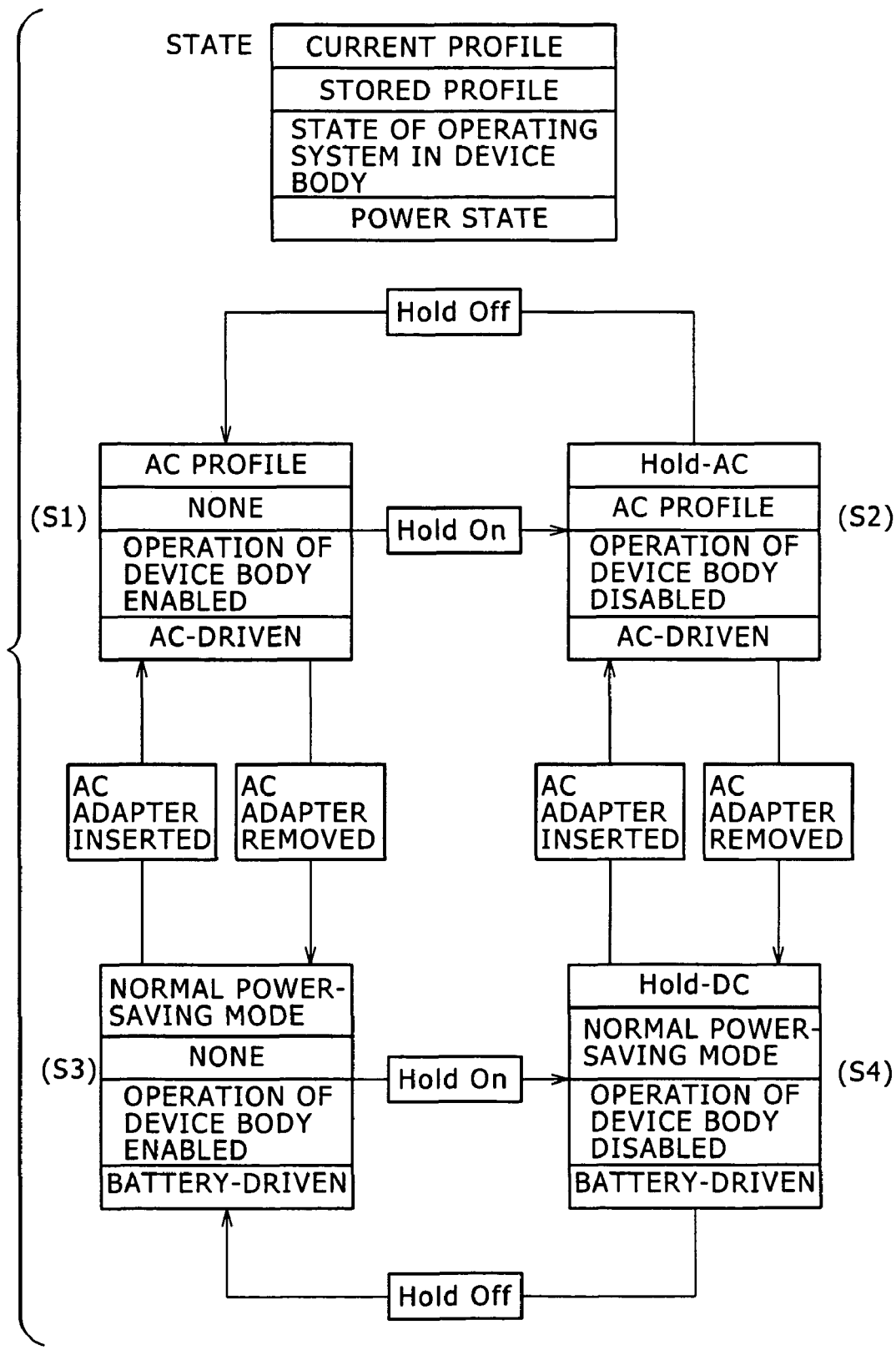
FIG. 9 is a view showing the power management state and an example of state shift.

FIG. 9 is a state transition diagram showing state transition among the following four states from the state (S1) to the state (S4). Four lines in a rectangle for each state represent, from top to bottom, a current profile, a profile stored in the current state, a state of the operating system in the device body (enabled or disabled), and a power state (AC-driven or a battery-driven) respectively.

The state (S1) is "AC profile", and in this state, a power from an AC adaptor is being used. This state is not stored as a profile, and an operation of the device body section is enabled.

The state (S2) is "Hold—AC profile", and a power from an AC adaptor is being used (AC-driven). In this state, "AC profile" is stored, and an operation of the device body (excluding that of the hold switch) is disabled.

The state (S3) is "Normal power-saving profile (in which the power-saving effect can be attained), and the device is driven by a battery. This state is not stored as a profile, and an operation of the device body is enabled.

The state (S4) is "Hold-DC profile" indicating the battery-driven state, and this profile is "Maximum power-saving profile" (in which the maximum power-saving profile can be achieved). In this state, "normal power-saving profile" is stored, and an operation of the device body (excluding an operation of the hold switch 23) is disabled.

In the state (S1) and state (S2), the device is driven by a utility power via an AC adaptor, while in the state (S3) and state (S4), the device is driven by a battery.

The state transition among the four states above is carried out as indicated by the arrows, and related operations and causes for the operations (triggers) are as described below.

Operation of the hold switch 23 (Refer to "Hold on", "Hold off" in the figure)

AC adaptor inserted/removed (Refer to "AC inserted" or "AC removed" in the figure).

In the AC-driven move, at first, the hold switch 23 is turned ON (for instructing holding) to shift the state (S1) to (S2). Then the hold switch 23 is turned OFF (for releasing the holding state) with the state (S2) shifted to state (S1).

When driven with a battery, the hold switch 23 is turned ON (for instructing holding) with the state (S3) shifted to state (S4). With this operation, the maximum power-saving effect can be achieved. Then the hold switch 23 is turned OFF (for releasing the holding state) with the state (S4) shifted to state (S3).

As for start transition by inserting or removing an AC adaptor, the "AC removed" in the figure indicates that the AC adaptor is disconnected, and "AC inserted" indicates that the AC adaptor is connected to the device. When the state (S1) is effected, the state is shifted to the state (S3) in the state "AC removed", and when the state (S3) is effected, the state is shifted to the state (S1) in the state of "AC inserted". Further when the state (S2) is effected, the state is shifted to the state (S4) in the state "AC removed", and when the state (S4) is effected, the state is shifted to the state (S2) in the state "AC inserted".

With the processing according to set values relating to the profiles described above, the processing capability of the device is changed or an operation of the device is disabled for achieving the power-saving effect by controlling various types of devices, or power supply to the device is disconnected. When switched to the operating mode without power saving, the original processing capability of the device is restored or the disabled state of the device is released, or power supply is restarted.

The methods for saving a power consumed by a device include the followings:
(a) Method of changing the CPU performance
(b) Method of changing the image display performance
(c) Method of changing brightness of a display screen
(d) Method of changing a heat emission control method (e) A method of electrically disconnecting a semiconductor memory which can be loaded on or off from the device body or an auxiliary memory device (hard disk drive unit and the like) not in use
(f) Method of stopping power supply to a link, a connection port, a radio LAN board, and the like to which power can be supplied In the method (a), power consumption can be reduced by lowering the clock frequency and power voltage to the minimum levels. For instance, a battery-driven period of time can be prolonged by setting a clock frequency or a power voltage to appropriate levels respectively according to the usage of the device, or by restricting the processing speed for power saving.

In the methods (b) and (c), it is possible to change the setting for operation of the device, for instance, by lowering luminescence of lighting for display, or by turning OFF power to a light source for lighting when any operation is not performed for a prespecified period of time, or by lowering the display processing speed.

In the method (d) of controlling heat emission, a cooling fan is activated for heat emission when a temperature in the device body rises, and in this step, in which component a weight should be placed in heat emission can be specified (For instance, when the CPU is cooled with a fan, a rotational speed of the fan can be controlled to suppress noises generated by the fan).

In the method (e), power consumption can be reduced by automatically disconnecting, when a memory medium is not set in a slot thereof, power supply to the slot, or by automatically stopping power supply when a hard disk drive is connected thereto and any access is not performed for a prespecified period of time or more. Further when an optical disk drive unit incorporated in the device body is not used by a user for a long time, or when any disk is not set in the disk drive unit, power consumption can be reduced by stopping power supply to the device.

In the method (f), power supply to the port or board is turned OFF.

As an example of profiles used for power management or for power saving is shown in Table 1 below, in which the standard setting for the state (S1) and state (S3) is shown in the "Holding released" column, and the standard setting for the state (S2) and state (S4) in the "Holding effected" column.

| | Setting | AC/DC | Holding released | Holding effected |
|---|---|---|---|---|
| Power setting | Power for monitoring OFF (timer) | Connected to AC power | No | 5 sec |
| | | Battery in use | No | 5 sec |
| | Power to hard disk OFF (timer) | Connected to AC power | No | No |
| | | Battery in use | No | 3 minutes |
| | System standby (Timer) | Connected to AC power | In 25 minutes | No |
| | | Battery in use | In 25 minutes | 5 minutes |
| | System halt state (Timer) | Connected to AC power | No | No |
| | | Battery in use | In one hour | In one hour |
| Setting for power saving | Brightness of liquid crystal display | Connected to AC power | Maximum | Minimum |
| | | Battery in use | Maximum | Minimum |
| | Control of CPU | Connected to AC power | Automatic adjustment | Priority in power saving |
| | | Battery in use | Automatic adjustment | Priority in power saving |
| | Control of CPU fan | Connected to AC power | Maximum | Minimum |
| | | Battery in use | Maximum | Minimum |
| | Control over heat emission | Connected to AC power | Priority in heat emission | Priority in calmness |
| | | Battery in use | Priority in heat emission | Priority in calmness |
| | IEEE1394 port | Connected to AC power | Power ON | Power OFF |
| | | Battery in use | Power ON | Power OFF |
| | Connection port for a memory medium | Connected to AC power | Power ON | Power OFF |
| | | Battery in use | Power ON | Power OFF |
| | Power saving in touch panel | Connected to AC power | 3 minutes | 5 sec |
| | | Battery in use | 3 minutes | 5 sec |
| | Radio LAN | Connected to AC power | Power ON | Power OFF |
| | | Battery in use | Power ON | Power OFF |
| | CF card | Connected to AC power | Power ON | Power OFF |
| | | Battery in use | Power ON | Power OFF |
| | Ethernet | Connected to AC power | Power ON | Power OFF |
| | | Battery in use | Power ON | Power OFF |

In the table above, items for power setting and those for power saving in devices and the like are shown discretely.

Further the "timer" in the set item column indicates that time setting with a timer is possible. To describe in relation to the configuration shown in FIG. 6, the "IEEE 1394 port" and the "Connection port for a memory medium" correspond to ports in the devices 107, 108, and "touch panel" corresponds to the input device 111. Further the "radio LAN" corresponds to the device 106, the "CF card" to the device 109, and "Ethernet" (Registered trade name) to the device 110 respectively.

The "connected to AC power" in the "AC/DC" column indicates the state in which the device is connected to the AC power. Therefore, for instance, the item in the line of "battery in use" in the "Holding effected" column should be referred to for the "Hold-DC profile".

With the configuration as described above, the various advantages as described below can be obtained.

Function assignment to devices to each of which input is performed with a hardware key excluding the BMD and setting for disabling or enabling operations of the devices can easily be performed (Namely, any specific setting is not required to respond to the assignment change in the OS layer, driver layer, and application layer, so that the existing devices, device drivers, OS, and the like can be used as they are, and therefore this invention is effective for reducing the development cost and shortening a period required for development).

By using only one of the existing devices (such as an EC) as the BMD, it is not required to increase a packaging area on a circuit board, which is effective for size reduction of a circuit board, and assignment change or the like can easily be performed without using any the OS or any specific program only on the condition that power is supplied to the EC.

By operating a plurality of operation buttons simultaneously for functional assignment, or by sharing an operating button with a plurality of devices, the number of operation buttons can be reduced (and also the product itself can be downsized).

By making a malfunction preventing switch available also for a switch for changing the operating state with low power consumption (power-saving state), the operability is improved with the operating time shortened, and also an area occupied with switches can be reduced.

When the malfunction switch is enabled by a user, the power saving mode is automatically effected, so that power saving is achieved even if the user is not specifically aware of the need of an instruction for shifting to the power saving mode.

By assuming a purpose of use or an application when any operation button is disabled and supplying power only to the required minimum number of devices, a battery-driven period can be prolonged.

In a case where an operation of an operation button is disabled or power saving mode is effected with the malfunction preventing switch, when a user put an information processing terminal in a bag or the like, in addition to the possibility of prolonging the battery-driven period, the safety is improved because the heat emission rate is suppressed.

In addition to the power-saving function in the conventional configuration (for instance, by stopping power supply to mode of components in the device with the information processing terminal also disabled), by specifying an application and supplying power to the required minimum number of devices, the power-saving mode in which the information processing terminal can be used is realized (For instance, by stopping power supply to the image display unit or an external connection terminal and supplying power only to the CPU and other devices related to the CPU and also to an audio device, the device can be used for reproduction of music.

In the configuration in which a wired remote controller connected to the device body is used, even when power supply to the image display unit and the like is disconnected, the function for reproducing music or the like can be used by operating a dedicated button on the remote controller.

While a preferred embodiment of the present invention has been described using specific terms, such description is for illustrative purpose only, and it is to be understood that changes and variations may be made without departing from the spirit or scope of the following claims.

What is claimed is:

1. An information processing apparatus comprising:
   a central processing unit configured to execute at least one application in the application layer;
   a plurality of operation elements in a hardware layer, the plurality of operation elements including at least one of a plurality of operation buttons, a plurality of operation keys, and a plurality of operation switches, said plurality of operation elements being configured to generate a plurality of operational information;
   a plurality of operation input devices provided in the hardware layer and configured to process the operational information and configured to provide the processed operational information to at the least one application in the application layer via a driver layer and an operating system layer, the application executing application processing in response to operational information provided;
   a control device provided in the hardware layer between the plurality of operation elements and the plurality of operation input devices, the control device being configured to provide operational information from at least one of the plurality of operation elements to at least one of the plurality of operation input devices according to a predetermined connectional relationship associating at least one of the plurality of operation elements to at least one of the operation input devices, the control device disabling operational elements without an association to at least one operation input device,
   wherein when a first operation element and a second operation element are actuated simultaneously, the control device provides operational information of a third operation element to a corresponding operation input device based on the predetermined connectional relationship, the operational information of the third operation element being different from operational information of the first operation element and operational information of the second operation element, and
   the control device disables at least one of the operation elements in response to a signal from an instructing unit separate from the central processing unit.

2. The information processing apparatus according to claim 1, wherein said control device is configured to change the connectional relationship among the operational elements and the operation input devices in accordance with a firmware memory.

3. The information processing apparatus according to claim 2, wherein the connectional relationship between the operational elements and the operation input devices is changed according to a display mode on a display screen.

4. The information processing apparatus according to claim 1, wherein at least one of the operational elements is enabled by said control device in response to another signal from the instructing unit.

5. The information processing apparatus according to claim 4, wherein said instructing unit has a malfunction preventing switch.

6. The information processing apparatus according to claim 5, wherein said malfunction preventing switch is also configured to switch to a power-saving mode.

7. The information processing apparatus according to claim 6, wherein, when an operation signal from said malfunction preventing switch is sent to said control device to instruct shifting to the power-saving mode, at least one of a processing performance of a calculating unit, a performance of an image display unit, and a brightness of a display screen is changed.

8. The information processing apparatus according to claim 1, wherein the operation input devices include a pointing device.

9. The information processing apparatus according to claim 1, wherein the operation input devices include a keyboard controller.

10. The information processing apparatus according to claim 1, wherein the operation input devices include a game controller.

11. The information processing apparatus according to claim 1, wherein the control device disables the at least one of the operation elements while the central processing unit is off.

12. A method of controlling an information processing apparatus comprising:
   executing, in a central processing unit, at least one application in an application layer;
   generating a plurality of operational information with a plurality of operation elements provided in a hardware layer of the information processing apparatus, the operation elements including at least one of a plurality of operation buttons, a plurality of operation keys, and a plurality of operation switches;

providing, from a control device in the hardware layer, operational information received by the control device from at least one operation element to at least one of a plurality of operation input devices according to a predetermined connectional relationship defining associations among the plurality of operation elements and the plurality of operation input devices;

disabling operation elements without an association to at least one of the plurality of operation input devices;

processing, in at least one of the plurality of operation input devices, the provided operational information;

providing, via a driver layer and an operating system layer, the processed operational information from the at least one of the plurality of operation input devices to the at least one application in the application layer; and executing, in the application layer, application processing in response to the processed operational information provided, wherein when operational information is simultaneously received from a first operation element and a second operation element, operational information corresponding to a third operation element is provided by the control device to the at least one operation input device according to the predetermined connectional relationship, the operational information of the third operation element being different from operational information of the first element and operational information of the second operation element, and at least one of the plurality of operation elements is disabled by the control device in response to a signal from an instructing unit separate from the central processing unit.

* * * * *